May 25, 1948.  R. W. PRICE  2,442,017
WELDING CONTROL SYSTEM
Filed Dec. 12, 1945
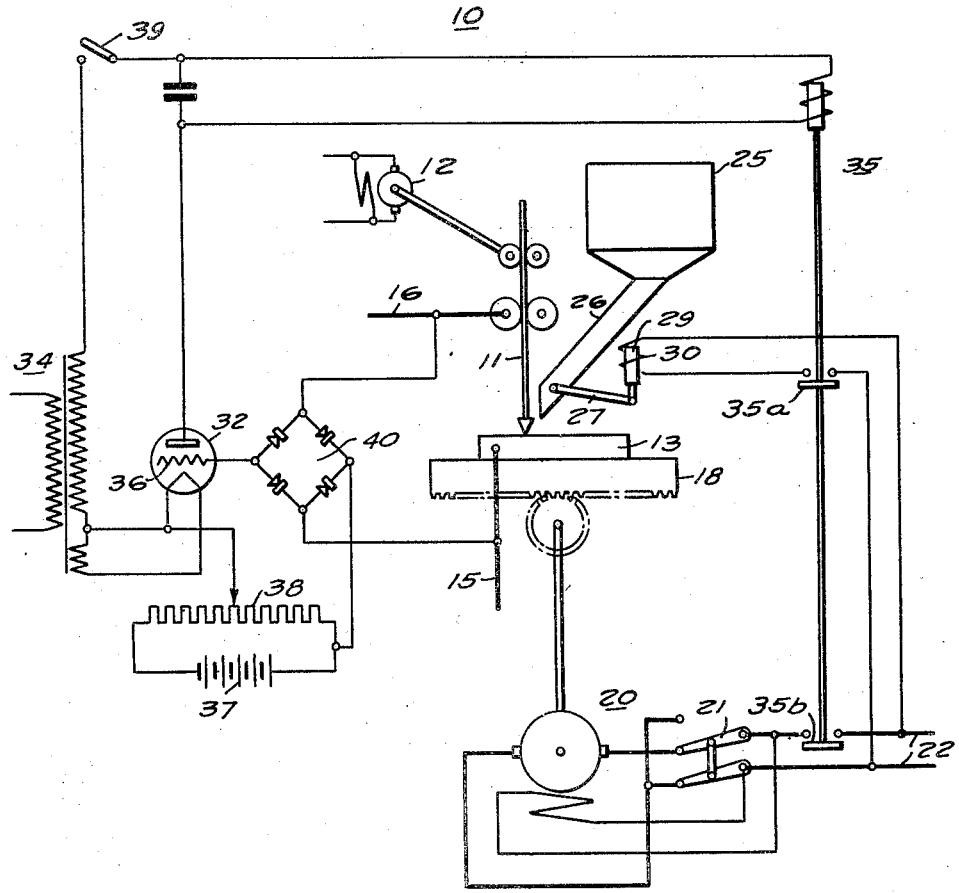
WITNESSES:
E. A. M'Closkey.
F. V. Giolma
INVENTOR
Robert W. Price.
BY
ATTORNEY Patented May 25, 1948

2,442,017

UNITED STATES PATENT OFFICE 2,442,017

WELDING CONTROL SYSTEM

Robert W. Price, Murrysville, Pa., assignor to Westinghouse Electric Corporation, East Pittsburgh, Pa., a corporation of Pennsylvania Application December 12, 1945, Serial No. 634,549

7 Claims. (Cl. 219—8)

My invention relates, generally, to control systems and it has reference, in particular, to electric arc-welding control systems and methods of arc welding.

Generally stated, it is an object of my invention to provide an arc-welding control system which is simple and inexpensive to manufacture and is reliable and efficient in operation.

More specifically, it is an object of my invention to provide for controlling different arc-welding operations in predetermined relation to the initiation of an arc in response to variations in the voltage or other characteristic of the arc-welding circuit.

It is also an object of my invention to provide for striking an arc between an electrode and work upon which a welding operation is to be performed, and thereupon applying welding flux about the arc.

Another object of my invention is to provide for effecting relative movement of the work and electrode along the line of a weld in response to initiation of an arc.

Yet another object of my invention is to provide an electric arc-welding control system which is responsive to the engagement of an arc welding electrode and work upon which a welding operation is to be performed for controlling the application of welding flux to the welding zone.

Still another object of my invention is to provide an automatic arc-welding system wherein an electrode is brought into engagement with work upon which a welding operation is to be performed for striking an arc before flux is applied to the work for substantially blanketing the arc.

Other objects will in part be obvious, and will in part be explained hereinafter.

In accordance with one embodiment of my invention, an arc-welding operation is commenced by feeding an electrode toward work upon which a welding operation is to be performed for striking an arc in the usual manner without the presence of welding flux which usually is non-conductive and impedes the striking of the arc. The accompanying reduction in open circuit voltage of the arc-welding circuit during striking of the arc is used to effect control of an electronic valve for initiating the supply of welding flux to the zone of the arc, and for effecting relative movement of the electrode and work along the line of the weld.

For a more complete understanding of the nature and scope of my invention, reference may be made to the following detailed description, which may be read in connection with the accompanying drawing, in which the single figure is a diagrammatic view of an arc-welding system embodying the invention in one of its forms.

Referring to the drawing, the reference numeral 10 may denote, generally, an arc-welding system wherein an electrode 11 may be actuated by an electrode feed motor 12 for maintaining it in arcing relation with work 13 upon which an arc-welding operation is to be performed. Welding current may be supplied to the electrode 11 and work 13 from any source of electrical energy of either alternating current or direct current, by means of conductors 15 and 16, which may be connected to the work 13 and electrode 11, respectively.

In order to provide for relative movement of the electrode 11 and work 13 along the line of a weld, the work 13 may be conveniently positioned on a movable support or table 18. Movement of the table 18 may be effected by means of a travel motor 20, which may be connected by a reversing switch 21 to a suitable source of current represented by the conductors 22.

For the purpose of substantially blanketing the arc and producing a submerged arc welding flux may be supplied to the weld zone from a hopper 25 having a spout 26 positioned adjacent the zone of welding and provided with a valve having an operating arm 27. The valve is preferably located in relatively close proximity to the arc zone so as to minimize time delay in furnishing flux to the arc. Means such as the solenoid 29, having an operating winding 30, may be provided for actuating the valve arm 27 for feeding flux to the weld zone.

In order to facilitate striking an arc between the electrode 11 and work 13, provision may be made for withholding the feed of welding flux to the weld zone until the arc is struck. For this purpose means such as the electronic valve 32 may be provided in connection with a source of alternating current such as the transformer 34 for controlling the operation of a control relay 35. The electronic valve 32 may be provided with a control electrode 36 disposed to be energized by a positive bias from a suitable source of current such as the battery 37 and voltage divider 38. A full wave rectifier bridge circuit 40 may be connected between the electrode 11 and conductor 15, which supplies electrical energy to the work 13. By connecting the direct current terminals of the bridge circuit 40 in opposition to the bias voltage from the battery 37 and properly selecting the setting of the voltage divider 38, a negative bias may be applied to the control electrode 36, to render the valve 32 non-conductive so long as the arc welding circuit is open-circuited. The reduction in the open circuit voltage between the conductors 15 and 16, which takes place upon engagement of the electrode and work during the striking of an arc between the electrode 11 and work 13, may therefore be used to render the electronic valve 32 conductive. By using the control relay 35 to connect the operating winding 30 of the solenoid 29 and the travel motor 20 to the conductors 22, the application of welding flux to the weld zone and movement of the work 13 relative to the electrode 11 may be effected in accordance with the initiation of an arc between the electrode 11 and the work 13.

In operation a control switch 39 may be closed to connect the electronic valve 32 and the control relay 35 to the transformer 34. The conductors 15 and 16 may be energized from a source of welding current at approximately the same time. Since the open circuit voltage between the conductors 15 and 16 may be relatively high, the resultant voltage applied to the control electrode 36 of the electronic valve 32 will be negative, thus preventing the valve from conducting. At the same time that the conductors 15 and 16 are energized, the feed motor 12 commences to operate in a manner well known in the art to feed the electrode 11 toward the work 13 for the purpose of striking an arc. When the electrode 11 engages the work 13, an arc may be readily struck since no flux is present to impede a good electrical connection between the electrode and the work.

Upon engagement of the electrode and the work, the open circuit voltage between the conductors 15 and 16 is reduced almost immediately to substantially zero, and when the feed motor 12 withdraws the electrode to strike an arc, it rises to the normal arc value. Accordingly, the bias voltage produced by the rectifier bridge circuit 40 is correspondingly reduced, and the voltage produced by the voltage divider 38 predominates, so that it renders the control electrode 36 sufficiently positive to make the valve conductive. The control relay 35 operates and connects the operating winding 30 and the travel motor 20 to the source represented by the conductors 22 through contact members 35 and 35b, respectively. The valve arm 27 is thereupon actuated to release welding flux from the hopper 25 for supplying it to the weld zone and the travel motor 20 operates so that the work 13 is moved relative to the electrode 11 for producing a weld.

From the above description and the accompanying drawing it will be apparent that I have provided in a simple and effective manner for improving the operation of arc-welding systems which use a relatively large amount of welding flux about the arc. Instead of having to strike the arc through a normally non-conducting flux, the arc is readily struck between the bare electrode and the work, and the welding flux is thereupon immediately supplied to the weld zone, whereupon it functions to produce all the beneficial results for which it is applied. By effecting application of the welding flux and relative movement of the electrode and work in response to the reduction in open circuit voltage of the arc-welding circuit when an arc is struck, a reliable and efficient control system is provided, which furnishes the flux only so long as it is necessary, and wastes a minimum amount thereof.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In an arc-welding system including an electrode and work connected to a source of electrical energy, means for supplying a non-conductive flux to the zone between the electrode and the work, which flux is of such a character that it interferes with striking an arc between the electrode and the work, and circuit means connected to effect operation of said means including an electrode-controlled valve having a control electrode energized in accordance with the voltage of the welding system for rendering it nonconductive while the voltage of the welding system remains at the open circuit value, so as to permit striking the arc without interference from the flux.

2. In a control system for a universal arc-welding circuit including an electrode and work connected to a source of electrical energy, means operable to perform an operation in predetermined relation to the striking of an arc between the electrode and the work, which comprises supplying a flux to the arc region which impedes engagement of the electrode with the work to strike an arc, valve means connected to control the operation of said means and provided with a control electrode, and circuit means including a full-wave rectifier connected to the arc-welding circuit for applying a control voltage to the control electrode for rendering the valve means conductive when an arc is established, so as to withhold supplying the flux until the arc is struck.

3. In a control system for an alternating-current or direct-current arc-welding circuit including an electrode and work connected to a source of electrical energy, switch means operable to effect the supply to an arc zone of a non-conductive flux material which impedes striking an arc in timed relation to the establishment of an arc between the electrode and the work, and means connecting the switch means to a source of alternating-current energy after the arc is initiated including valve means having a control electrode energized from the welding circuit.

4. In an arc-welding system including an electrode, work and a source of electrical energy, feed means operable to move the electrode relative to the work to strike and maintain an arc, travel means operable to effect relative movement of the work and electrode along a weld, flux supply means including a hopper having a valve operable to supply welding flux about the arc, and relay means energized in accordance with the voltage between the electrode and the work responsive to the establishment of an arc operable to effect operation of the valve subsequent to the initiation of an arc.

5. For use with an arc-welding circuit including an electrode and work connected to a source of electrical energy and disposed in arcing relation, supply means including a hopper having valve means operable to supply to the arc zone a welding flux which impedes striking an arc, and control means connected to the arc welding circuit responsive to a predetermined reduction in the voltage between the electrode and the work to effect operation of said valve means.

6. In a control system for an arc-welding system including an electrode and work connected to a source of electrical energy and actuated by feed means and travel means respectively for movement relative to each other, a hopper having valve means for supplying flux to the arc zone which impedes striking an arc, switch means operable to provide operating circuits for the travel means and the valve of the flux supplying means, valve means having a control electrode and connecting the switch means to a source of electrical energy, and circuit means connecting the control electrode to a source of positive bias and to the arc-welding system in opposition including a full-wave rectifier circuit for operating the valve means of the hopper to supply flux to the arc zone only after an arc is struck.

7. The combination with an arc-welding circuit including an arc electrode and work connected to a source of welding current, of a movable table supporting the work, a travel motor operable to move the work relative to the electrode, a feed motor operable to move the electrode relative to the work, a hopper provided with a spout having a valve positioned adjacent the electrode for supplying flux to the arc zone, solenoid means operable to actuate the valve to supply flux to the arc zone, switch means operable to effect energization of the travel motor and solenoid means, electronic valve means connecting the switch means to an alternating-current source, said valve means being provided with a control electrode, and circuit means for applying a control voltage to the control electrode of the valve means including a source of positive bias voltage and rectifier means energized from the arc-welding circuit connected in opposed relation and arranged to render the electronic valve means non-conductive when the arc-welding circuit is open-circuited.

ROBERT W. PRICE.

REFERENCES CITED

The following references are of record in the file of this patent:

UNITED STATES PATENTS

| Number | Name | Date |
|---|---|---|
| 1,536,774 | Clarkson | May 5, 1925 |
| 1,580,020 | Cutter et al. | Apr. 6, 1926 |
| 1,662,369 | Kjekstad | Mar. 13, 1928 |
| 1,701,372 | Jefts | Feb. 5, 1929 |
| 1,746,204 | Thomson | Feb. 4, 1930 |
| 1,827,245 | Lincoln et al. | Oct. 13, 1931 |
| 2,145,010 | Kennedy et al. | Jan. 24, 1939 |
| 2,152,785 | Blankenbuehler | Apr. 4, 1939 |
| 2,173,446 | Heindlhafer | Sept. 19, 1939 |
| 2,253,207 | Hopkins | Aug. 19, 1947 |
| 2,260,510 | Clapp | Oct. 28, 1947 |

FOREIGN PATENTS

| Number | Country | Date |
|---|---|---|
| 394,773 | Great Britain (1) | July 6, 1933 |
| 472,363 | Great Britain (2) | Sept. 22, 1937 |